(12) United States Patent
Yano et al.

(10) Patent No.: US 7,360,788 B2
(45) Date of Patent: Apr. 22, 2008

(54) INFLATOR AND AIRBAG APPARATUS

(75) Inventors: Kanji Yano, Praunheim (DE); Jun Nishimura, Hikone (JP)

(73) Assignee: Takata Corporation, Tokyo (JP)

( * ) Notice: Subject to any disclaimer, the term of this patent is extended or adjusted under 35 U.S.C. 154(b) by 247 days.

(21) Appl. No.: 11/151,285

(22) Filed: Jun. 14, 2005

(65) Prior Publication Data

US 2005/0275203 A1 Dec. 15, 2005

(30) Foreign Application Priority Data

Jun. 14, 2004 (JP) .............................. 2004-175685

(51) Int. Cl.
*B60R 21/272* (2006.01)
(52) U.S. Cl. ..................... 280/737; 280/741
(58) Field of Classification Search ................ 280/736, 280/741, 737
See application file for complete search history.

(56) References Cited

U.S. PATENT DOCUMENTS

| | | | |
|---|---|---|---|
| 3,770,387 A | | 11/1973 | Loomba |
| 3,788,667 A | * | 1/1974 | Vancil ........................ 280/737 |
| 3,817,263 A | | 6/1974 | Bendler et al. |
| 3,961,806 A | * | 6/1976 | Katter ........................ 280/732 |
| 5,470,104 A | | 11/1995 | Smith et al. |
| 5,531,473 A | | 7/1996 | Rink et al. |
| 5,553,889 A | | 9/1996 | Hamilton et al. |
| 5,602,361 A | | 2/1997 | Hamilton et al. |
| 5,607,181 A | * | 3/1997 | Richardson et al. ........ 280/737 |
| 5,615,912 A | * | 4/1997 | O'Loughlin et al. ........ 280/737 |
| 5,616,883 A | | 4/1997 | Hamilton et al. |
| 5,673,934 A | * | 10/1997 | Saccone et al. ............. 280/737 |
| 5,709,406 A | * | 1/1998 | Buchanan ................... 280/737 |
| 5,738,372 A | | 4/1998 | Lowe et al. |
| 5,779,266 A | | 7/1998 | Moore et al. |
| 6,010,153 A | | 1/2000 | Halas et al. |
| 6,012,737 A | * | 1/2000 | Van Wynsberghe et al. ..... 280/737 |
| 6,095,556 A | | 8/2000 | Bailey et al. |
| 6,332,404 B1 | * | 12/2001 | Rink et al. ................... 102/530 |
| 6,382,668 B1 | | 5/2002 | Goetz |
| 6,634,302 B1 | * | 10/2003 | Rink et al. ................... 102/530 |
| 6,705,637 B1 | | 3/2004 | Goto et al. |
| 6,860,205 B2 | * | 3/2005 | Baker et al. ............. 244/129.1 |
| 6,874,813 B2 | | 4/2005 | Perotto et al. |
| 7,032,778 B2 | * | 4/2006 | Bock et al. ..................... 222/3 |
| 2003/0151241 A1 | | 8/2003 | Matsuda et al. |
| 2004/0222620 A1 | | 11/2004 | Wang et al. |

FOREIGN PATENT DOCUMENTS

| | | |
|---|---|---|
| JP | 9-323614 | 12/1997 |
| JP | 2000-85521 | 3/2000 |
| JP | 2003-146182 | 5/2003 |

* cited by examiner

*Primary Examiner*—Paul N. Dickson
*Assistant Examiner*—Leonard McCreary, Jr.
(74) *Attorney, Agent, or Firm*—Manabu Kanesaka

(57) ABSTRACT

An inflator is a hybrid inflator constructed by coupling a tank charged with a pressurized gas and a gas generator containing a gas-generating chemical. A coupling mechanism is provided in each of the tank and the gas generator, and the tank and the gas generator are coupled to each other with the coupling mechanisms.

4 Claims, 3 Drawing Sheets

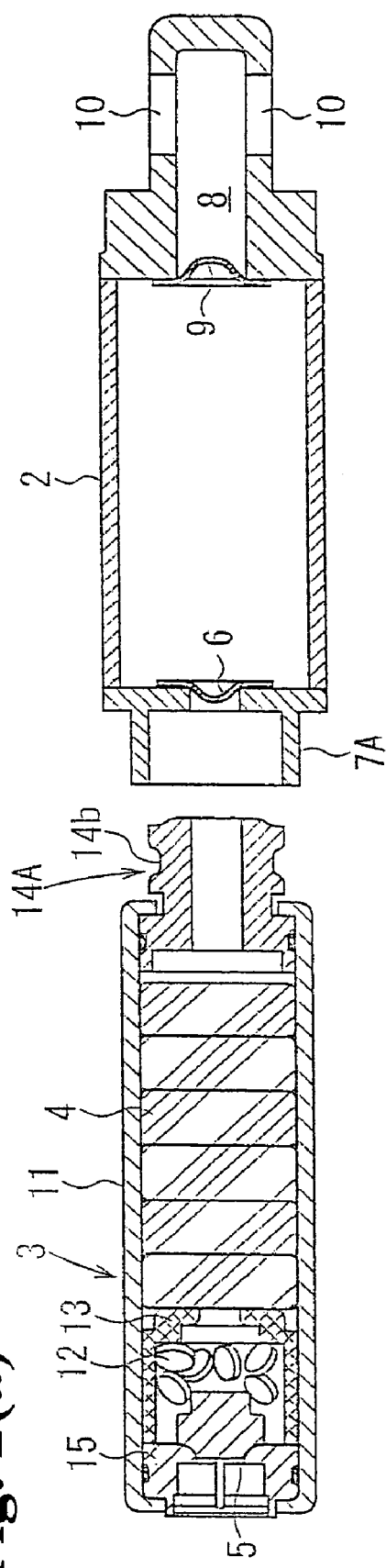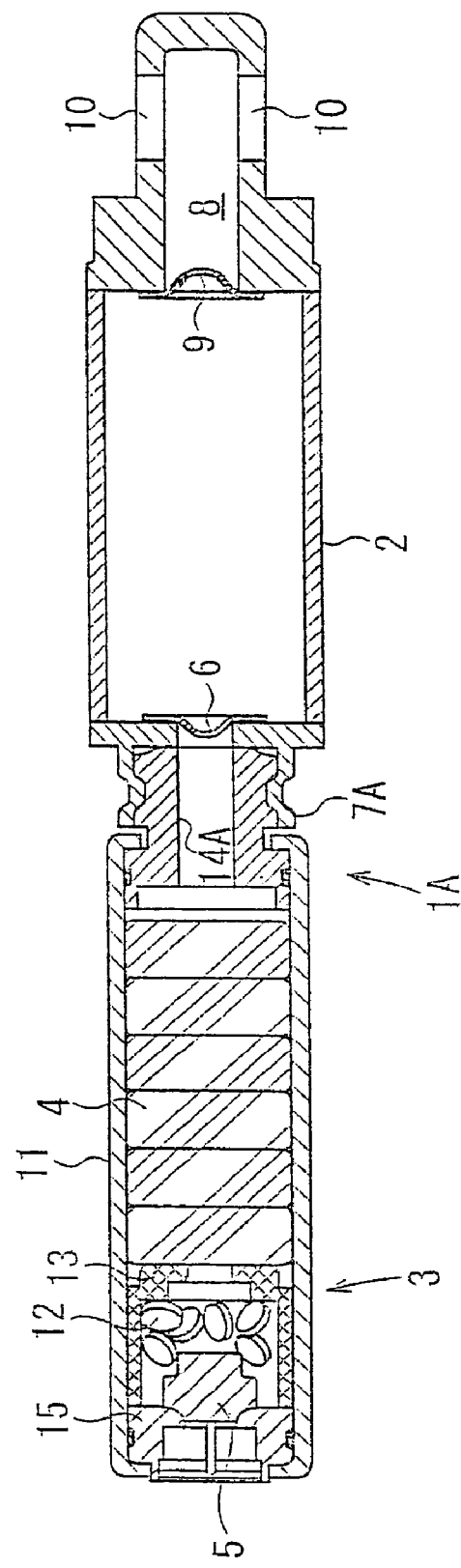

INFLATOR AND AIRBAG APPARATUS

BACKGROUND OF THE INVENTION AND RELATED ART STATEMENT

The present invention relates to an inflator used in an airbag apparatus, and in particular, to a hybrid inflator for releasing a gas generated from a gas-generating chemical and a pressurized gas stored therein. In addition, the present invention relates to an airbag apparatus using the inflator.

A hybrid inflator includes a gas generator containing gas-generating chemicals ignited by an initiator; and a tank charged with a pressurized gas. When the chemicals start to react by the initiator, the reaction gas flows into the tank. Then, a sealing plate separating the tank and a gas outlet is ruptured, and a mixed gas of a gas stored in the tank (hereinafter referred to as stored gas) and the reaction gas is released from the gas outlet.

Japanese Patent Publication (Kokai) No. 2003-81050 discloses an inflator in which one end of a cylindrical tank is attached to a gas generator by welding, and a gas outlet is provided at the other end of a gas storage chamber.

In the inflator disclosed in Japanese Patent Publication (Kokai) No. 2003-81050, a distance from a welded part of the tank and the gas generator to the chemicals in the gas generator is short. Therefore, it is necessary to perform a welding so as not to ignite the chemicals due to heat generated during the welding. Accordingly, it is difficult to produce the inflator and reduce manufacturing cost of the inflator.

In Japanese Patent Publication (Kokai) No. 2003-81050, the opening at one end of the tank is welded directly to the gas generator, and the gas is charged in the tank after the welding between the tank and the gas generator is completed. When the gas is charged after the tank and the gas generator are welded, it is necessary to provide a gas-charging device in an assembling process of the inflator, thereby increasing assembling cost of the inflator.

In view of the problems described above, an object of the present invention is to provide an inflator that is easy to manufacture.

Another object of the present invention is to provide an inflator that is constructed by attaching a tank filled with a gas in advance to a gas generator.

Further objects and advantages of the invention will be apparent from the following description of the invention.

SUMMARY OF THE INVENTION

In order to attain the objects described above, according to a first aspect of the present invention, an inflator is a hybrid inflator constructed by coupling a tank charged with a pressurized gas and a gas generator containing a gas-generating chemical. A coupling mechanism is provided in each of the tank and the gas generator, and the tank and the gas generator are coupled to each other with the coupling mechanisms.

According to a second aspect of the present invention, in the inflator in the first aspect, the coupling mechanisms are one of screw mechanisms or tight-fitting mechanisms.

According to a third aspect of the present invention, an inflator is a hybrid inflator constructed by coupling a tank charged with a pressurized gas and a gas generator containing a gas-generating chemical. A gas-discharging nozzle protrudes from the gas generator toward the tank, and a front end of the nozzle is coupled to the tank by welding.

According to a fourth aspect of the present invention, in the inflator in the third aspect, the tank includes a gas outlet and a gas inlet from the gas generator, and an interior of the tank is separated from the gas outlet and the gas inlet by a sealing member. The gas generator and the tank previously charged with the gas are coupled to each other.

According to a fifth aspect of the present invention, an inflator is a hybrid inflator constructed by coupling a tank charged with a pressurized gas and a gas generator containing a gas-generating chemical. The tank includes a gas outlet and a gas inlet from the gas generator, and an interior of the tank is separated from the gas outlet and the gas inlet by a sealing member. The gas generator and the tank previously charged with the gas are coupled to each other.

According to the present invention, an airbag apparatus includes the inflator of the present invention and an airbag expanded by the gas from the inflator.

In the inflator in the first aspect, the tank and the gas generator are coupled to each other by the coupling mechanisms provided in both of them. Accordingly, it is not necessary to perform a welding operation to couple both the tank and gas generator to each other. In the second aspect, when the coupling mechanisms use screws or tight-fitting, the coupling becomes extremely easy.

In the inflator in the third aspect, the nozzle protrudes from the gas generator, and the front end of the nozzle is welded to the tank. Accordingly, it is possible to increase a distance between the welded part and the chemical in the gas generator, thereby keeping welding heat away from the chemical. It is easy to perform the welding operation, and the manufacturing efficiency of the inflator improves.

In the inflator in the fourth and fifth aspects, the gas generator and the tank previously charged with the gas are coupled to each other. Accordingly, it is possible to combine a tank having a different gas pressure or capacity and a gas generator having a different gas-generating characteristic to obtain various output characteristics. It is not necessary to provide a gas-charging device in an assembling process of the inflator, thereby reducing assembling cost of the inflator.

BRIEF DESCRIPTION OF THE DRAWINGS

FIGS. 1(a) and 1(b) are sectional views of an inflator according to a first embodiment of the present invention, wherein FIG. 1(a) shows a state before a gas generator and a tank are coupled to each other, and FIG. 1(b) shows a state in which the gas generator and the tank are coupled to each other;

FIGS. 2(a) and 2(b) are sectional views of an inflator according to a second embodiment of the present invention, wherein FIG. 2(a) shows a state before a gas generator and a tank are coupled to each other, and FIG. 2(b) shows a state in which the gas generator and the tank are coupled to each other; and FIGS. 3(a) and 3(b) are sectional views of an inflator according to a third embodiment of the present invention, wherein FIG. 3(a) shows a state before a gas generator and a tank are coupled to each other, and FIG. 3(b) shows a state in which the gas generator and the tank are coupled to each other.

DETAILED DESCRIPTION OF PREFERRED EMBODIMENTS

Figure 1A:
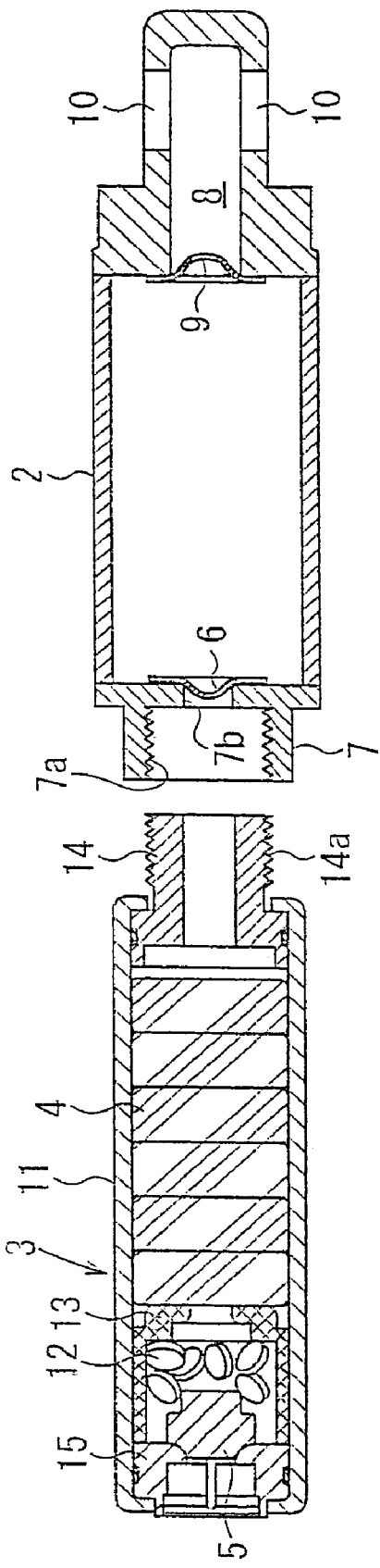
Figure 1B:
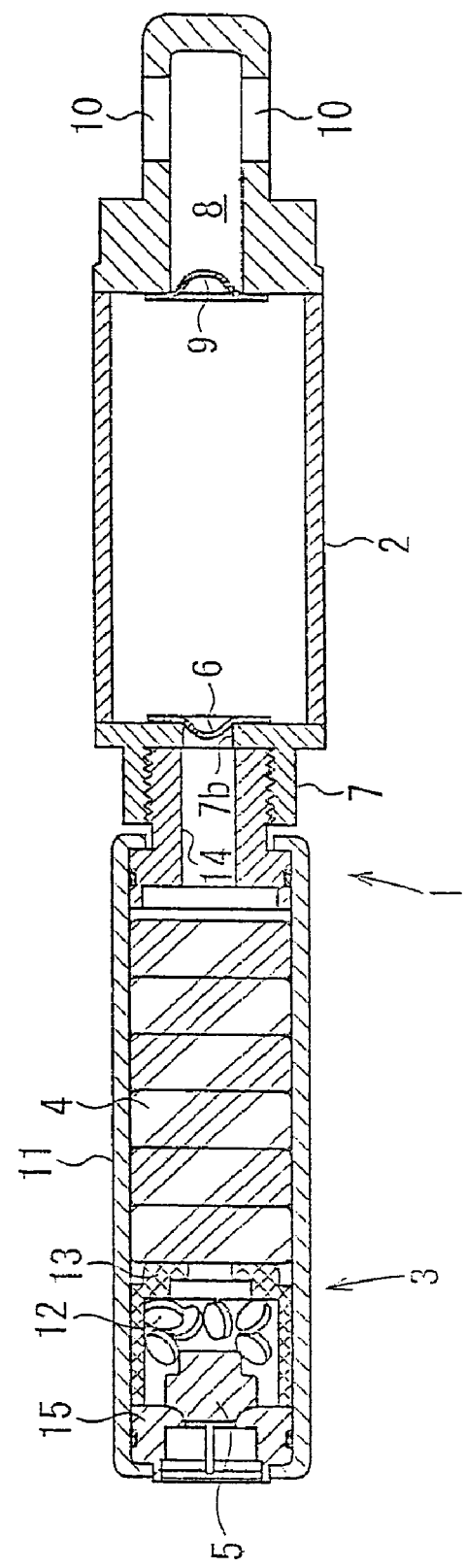

Hereinafter, embodiments of the present invention will be described with reference to the accompanying drawings. FIGS. 1(a) and 1(b) are sectional views of an inflator according to a first embodiment of the present invention, wherein FIG. 1(a) shows a state before a gas generator and a tank are coupled to each other, and FIG. 1(b) shows a state in which the gas generator and the tank are coupled to each other.

An inflator 1 comprises a substantially cylindrical tank 2; a gas generator 3 that contains chemicals 4 and an initiator 5 and is fixed to one end of the tank 2; a first sealing plate 6 that separates an interior of the gas generator 3 from a gas inlet 7 at one end of the tank 2; and a second sealing plate 9 that separates the other end of the tank 2 from a guide hole 8 communicating with a gas outlet 10.

The tank 2 is made of steel and contains a gas such as nitrogen, argon, and helium with a pressure of about 10,000 to 70,000 kPa. A cylindrical gas inlet 7 protrudes from one end of the tank 2. A female screw 7a is formed on an inner circumferential face of the gas inlet 7 as a coupling mechanism. A communicating hole 7b that communicates between the gas inlet 7 and the interior of the tank 2 is sealed by the first sealing plate 6.

The sealing plate 6 is made from, for example, stainless sheet, and is fixed to an inner face of the tank 2 by welding, etc. A substantially hemispheric bulging portion that enters the communicating hole 7b is provided on the first sealing plate 6 to endure the pressure of the interior of the tank 2.

The other end of the tank 2 is provided with a guide hole 8, and a gas outlet 10 is disposed at the end of the guide hole 8. The second sealing plate 9 is provided so as to seal an inlet end of the guide hole 8. A substantially hemispheric bulging portion provided on the second sealing plate 9 enters the guide hole 8. The second sealing plate 9 is fixed to a circumferential edge of the inlet end of the guide hole 8 by welding, etc. A filter (not shown) may be provided in the guide hole 8 to collect reaction residues of the chemicals 4, etc.

The gas generator 3 comprises a cylindrical casing 11; the gas-generating chemicals 4 contained in the casing 11; the initiator 5 and igniting chemicals 12 for igniting the chemicals 4; and a filter element 13 composed of meshes placed between the igniting chemicals 12 and the gas-generating chemicals 4.

The igniting chemicals and ignition means such as a resistance heating element for igniting the igniting chemicals are provided in the initiator 5. When power is supplied to the ignition means, the igniting chemicals react to generate a high-temperature gas. The initiator 5 is held at the rear end in the casing 11 via an initiator holder 15. A gas-outflow nozzle 14 protrudes from the front end of the casing 11. A male screw 14a is formed on the outer circumferential face of the nozzle 14 as the coupling mechanism.

In the present embodiment, a gas with a predetermined pressure is charged in the tank 2 in advance. The inflator 1 can be assembled by screwing the nozzle 14 of the gas generator 3 to the gas inlet 7 of the tank 2 to couple the gas generator 3 with the tank 2. The inner hole of the nozzle 14 extends to the communicating hole 7b linearly.

An operation of the inflator described above will be explained next. When power is supplied to the initiator 5, the initiator 5 generates a high-temperature gas. Accordingly, the igniting chemicals 12 start to react by the high-temperature gas, and the chemicals 4 generate a large amount of reaction gas when the gas contacts the chemicals 4. The first sealing plate 6 ruptures with a gas pressure, and the gas flows into the tank 2. Then, the second sealing plate 9 ruptures with a gas pressure in the tank 2, and the gas is released from the guide hole 8 via the gas outlets 10, thereby rapidly expanding the airbag.

In the inflator 1 of the present invention, the gas generator 3 and the tank 2 are coupled by screwing the nozzle 14 having the male screw 14a to the gas inlet 7 having the female screw 7a. Accordingly, it is not necessary to weld the nozzle and gas inlet. Therefore, an assembling operation of the inflator 1 becomes easy, and the manufacturing cost can be decreased. In addition, an inflator having various output characteristics (gas pressure or gas-generating duration etc.) can be assembled by preparing plural types of tanks 2 having different gas pressures or capacities and plural types of gas generators 3 having different characteristics such as gas-generating amount, pressure, and gas temperature, and by changing the combinations thereof. Since the gas is previously charged in the tank 2, the gas-charging device is not required in the assembling process of an inflator, and the assembling cost of the inflator can be decreased.

Figure 3A:
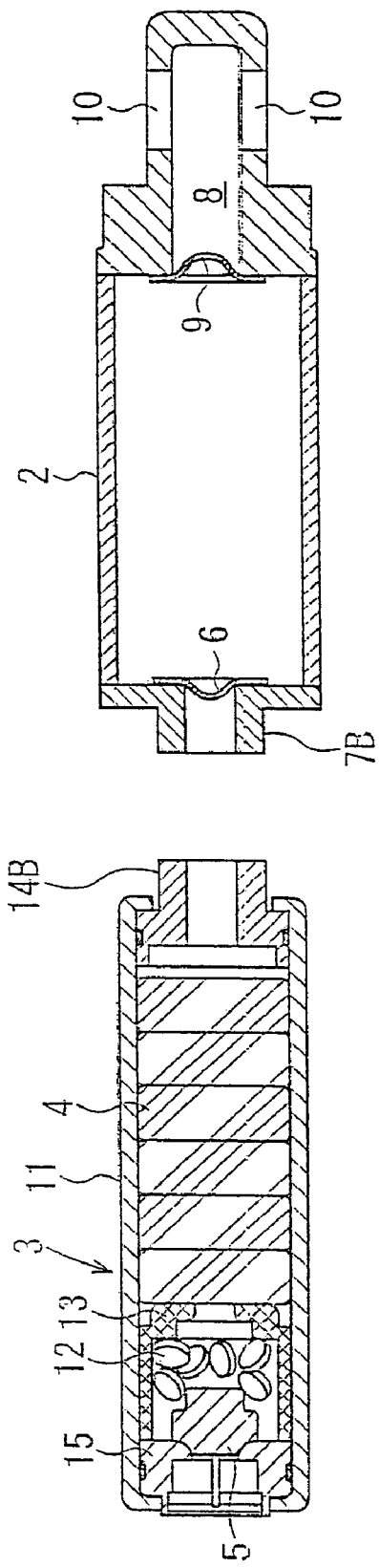
Figure 3B:
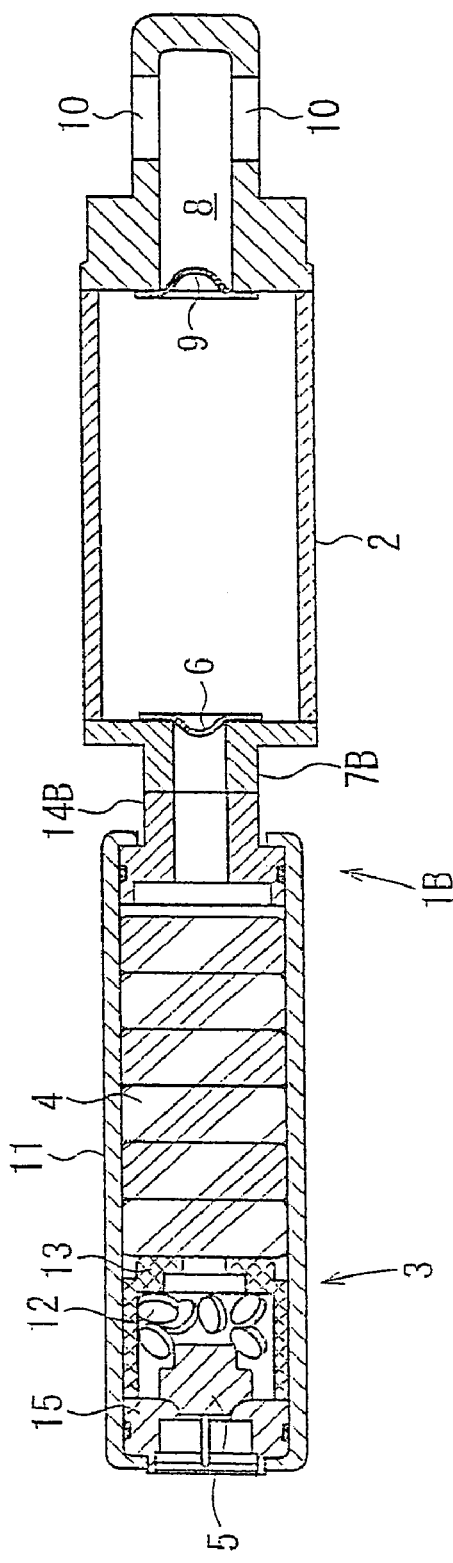

FIGS. 2(a) and 2(b) are sectional views of an inflator 1A according to a second embodiment of the present invention, wherein FIG. 2(a) shows a state before a gas generator and a tank are coupled to each other, and FIG. 2(b) shows a state in which the gas generator and the tank are coupled to each other. FIGS. 3(a) and 3(b) are sectional views of an inflator 1B according to a third embodiment of the present invention, wherein FIG. 3(a) shows a state before a gas generator and a tank are coupled to each other, and FIG. 3(b) shows a state in which the gas generator and the tank are coupled to each other.

In the inflator 1A shown in FIGS. 2(a) and 2(b), instead of a male screw, a recessed thread 14b is formed on an outer circumferential face of a nozzle 14A of a gas generator. In addition, no female screw exists on an inner circumferential face of a gas inlet 7A of the tank 2. The gas generator 3 and the tank 2 are coupled to each other by inserting the nozzle 14A into the gas inlet 7A, and then tight-fitting the gas inlet 7A, thereby constructing the inflator 1A.

Other components of the inflator 1A are the same as those in the first embodiment, and the same reference numerals indicate the same components. The inflator 1A also has the same effect as that of the inflator 1.

In the inflator 1B shown in FIGS. 3(a) and 3(b), a front end face of a nozzle 14B of a gas generator butts against a front end face of a gas inlet 7B, and a nozzle 14B and a gas inlet 7B are welded to each other. As a welding method, electron beam welding is preferable, and electric welding such as laser welding or MIG welding may be employed. Other components of the inflator 1B are the same as those in FIGS. 1(a) and 1(b) to 2(a) and 2(b), and the same reference numerals denotes the same components.

In the inflator 1B, welding is employed, and the nozzle 14B protrudes forward. Accordingly, a distance from the welded part (the front end of the nozzle 14B) to the chemicals 4 is large, so that the reaction of the chemicals due to the welding heat does not occur. Therefore, the manufacture of the inflator 1B is easy. In the present embodiment, the gas is previously charged in the tank 2. Thus, many kinds of inflators can be provided by combining various types of tanks and gas generators. Further, a gas-charging device is not required in the assembling process of an inflator, thereby reducing assembling cost of the inflator.

The embodiments are just examples of the present invention, and the present invention can take forms other than those illustrated in the drawings. For example, in FIGS. 1(a) and 1(b) to 2(a) and 2(b), the nozzles 14 and 14A are inserted into the gas inlets 7 and 7A, and screwed or tight-fitted thereto. The gas inlet may be inserted into the nozzle and be screwed or tight-fitted thereto.

The inflator of the present invention can be applied to various kinds of airbag apparatuses, such as those for a front passenger, a head-protection, a shoulder-protection and a driver.

The disclosure of Japanese Patent Application No. 2004-175685, filed on Jun. 14, 2004, is incorporated in the application.

While the invention has been explained with reference to the specific embodiments of the invention, the explanation is illustrative and the invention is limited only by the appended claims.

What is claimed is:

1. An inflator comprising:
a tank charged with a pressurized gas and having a first cylindrical projection which is smaller in diameter than the tank and separately made to project therefrom, and
a gas generator containing gas-generating chemicals and having a second cylindrical projection as a nozzle protruding toward the first cylindrical projection, said second cylindrical projection having a diameter smaller than that of the gas generator and same as that of the first cylindrical projection, said second cylindrical projection abutting against and attached to the first cylindrical projection by means of a welding.

2. An inflator according to claim 1, wherein said tank includes a gas outlet, a gas inlet, a first sealing member disposed between an interior of the tank and the gas outlet for sealing the interior of the tank, and a second sealing member disposed between the interior of the tank and the gas inlet for sealing the interior of the tank.

3. An airbag apparatus comprising an airbag and the inflator according to claim 1 for inflating the airbag.

4. An inflator according to claim 1, wherein said second cylindrical projection comprises a gas-out-flow nozzle.

* * * * *